(12) United States Patent
Kang

(10) Patent No.: US 12,298,503 B2
(45) Date of Patent: May 13, 2025

(54) HEAD-UP DISPLAY DEVICE

(71) Applicant: HYUNDAI MOBIS CO., LTD., Seoul (KR)

(72) Inventor: Hyun Woo Kang, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 459 days.

(21) Appl. No.: 17/752,315

(22) Filed: May 24, 2022

(65) Prior Publication Data
US 2022/0404617 A1 Dec. 22, 2022

(30) Foreign Application Priority Data

Jun. 17, 2021 (KR) .................. 10-2021-0078907

(51) Int. Cl.
*G02B 27/01* (2006.01)
*G02B 5/09* (2006.01)
*G02B 5/10* (2006.01)

(52) U.S. Cl.
CPC .......... *G02B 27/0101* (2013.01); *G02B 5/09* (2013.01); *G02B 5/10* (2013.01); *G02B 27/0149* (2013.01); *G02B 2027/0161* (2013.01)

(58) Field of Classification Search
CPC ........ G02B 27/0101; G02B 5/09; G02B 5/10; G02B 27/0149; G02B 2027/0161
USPC ........................................... 359/630; 345/7–9
See application file for complete search history.

(56) References Cited

U.S. PATENT DOCUMENTS

2017/0299922 A1* 10/2017 Matsuura ........... G02B 27/0101

* cited by examiner

*Primary Examiner* — William Choi
(74) *Attorney, Agent, or Firm* — NovoTechIP International PLLC

(57) ABSTRACT

According to at least one aspect, the present disclosure provides a head-up display device comprising: a housing having a receiving space therein; a display unit disposed over the housing; a light source unit disposed so that a main optical axis is not directed at the display unit; a first reflector reflecting at least some of light emitted from the light source unit towards the display unit; and a diffuser disposed on an optical path of the light source unit reflected from the first reflector to uniformly make light.

12 Claims, 6 Drawing Sheets

HEAD-UP DISPLAY DEVICE

CROSS-REFERENCE TO RELATED APPLICATION

This application claims priority to and the benefit of Korean Patent Application No. 10-2021-0078907, filed on Jun. 17, 2021, the disclosure of which is incorporated herein by reference in its entirety.

TECHNICAL FIELD

The present disclosure relates to a head-up display device.

BACKGROUND

The content described in this section merely provides the background information on the present disclosure and does not constitute the prior art.

Recently, an automobile market is developing with preference for an intelligent automobile equipped with advanced Information Technology (IT). In particular, products which support driving stability and driver's convenience are being released. Among them, a Head-Up Display (HUD) for a vehicle is receiving attention.

The head-up display device may provide various pieces of screen information to the driver by generating a virtual image in front of a driver, especially on a windshield and displaying information in the virtual image. The information provided to the driver may include dashboard information such as vehicle speed, a remaining fuel amount, or the Revolution Per Minute (RPM) of an engine and navigation information. Since the driver may easily grasp information displayed on a front without moving his or her eyes while driving, driving stability may be enhanced. The HUD system may provide a driver with lane indications, construction indications, traffic-accident indications, and warning indications indicating pedestrians, which are helpful when a front view is not good, in addition to the dashboard information and the navigation information, in an Augmented Reality (AR) technique.

FIG. 1 is a diagram showing a conventional head-up display device. In FIG. 1, an LCD 6 is disposed to pass through a main optical axis A of an LED 3. The LED 3 is disposed on a printed circuit board 2, and a heat sink 1 is disposed on a surface of the printed circuit board 2. Some of light generated by the LED 3 passes through a reflector 4 and diffusers 5a and 5b and is projected onto the LCD 6, while the other light passes directly through the diffusers 5a and 5b without passing through the reflector 4 and is projected onto the LCD 6. Therefore, the LCD 6 directly absorbs some of radiant heat generated by the LED 3. The LCD 6 directly absorbs radiant heat from the LED 3 to cause the LCD 6 to be deteriorated. This consequently deteriorates the performance of the LCD 6.

SUMMARY

According to at least one aspect, the present disclosure provides a head-up display device comprising: a housing having a receiving space therein; a display unit disposed over the housing; a light source unit disposed so that a main optical axis is not directed at the display unit; a first reflector reflecting at least some of light emitted from the light source unit towards the display unit; and a diffuser disposed on an optical path of the light source unit reflected from the first reflector to uniformly make light.

DETAILED DESCRIPTION

Figure 1:
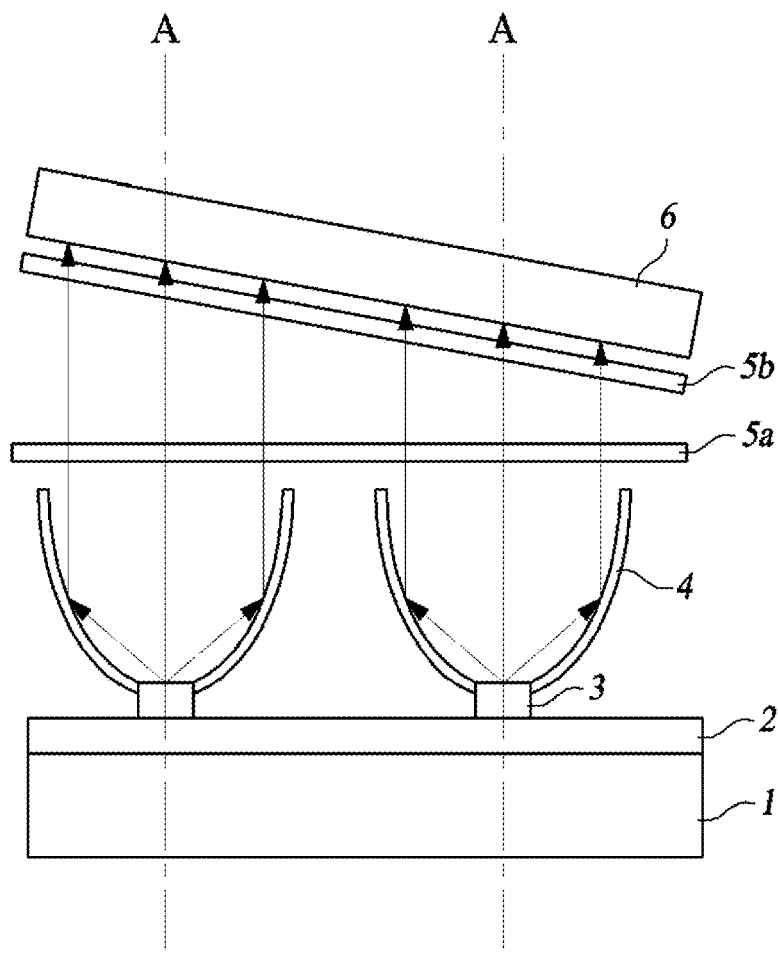
FIG. 1 is a diagram showing a conventional head-up display device.

In view of the above, a head-up display device according to an embodiment can prevent the deterioration of a display unit due to a radiant-heat source of a light source unit.

The problems to be solved by the present disclosure are not limited to the above-mentioned problems, and other problems which are not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' module,' and the like refer to one or more units for processing at least one function or operation, which may be implemented by hardware, software, or a combination thereof.

Figure 2:
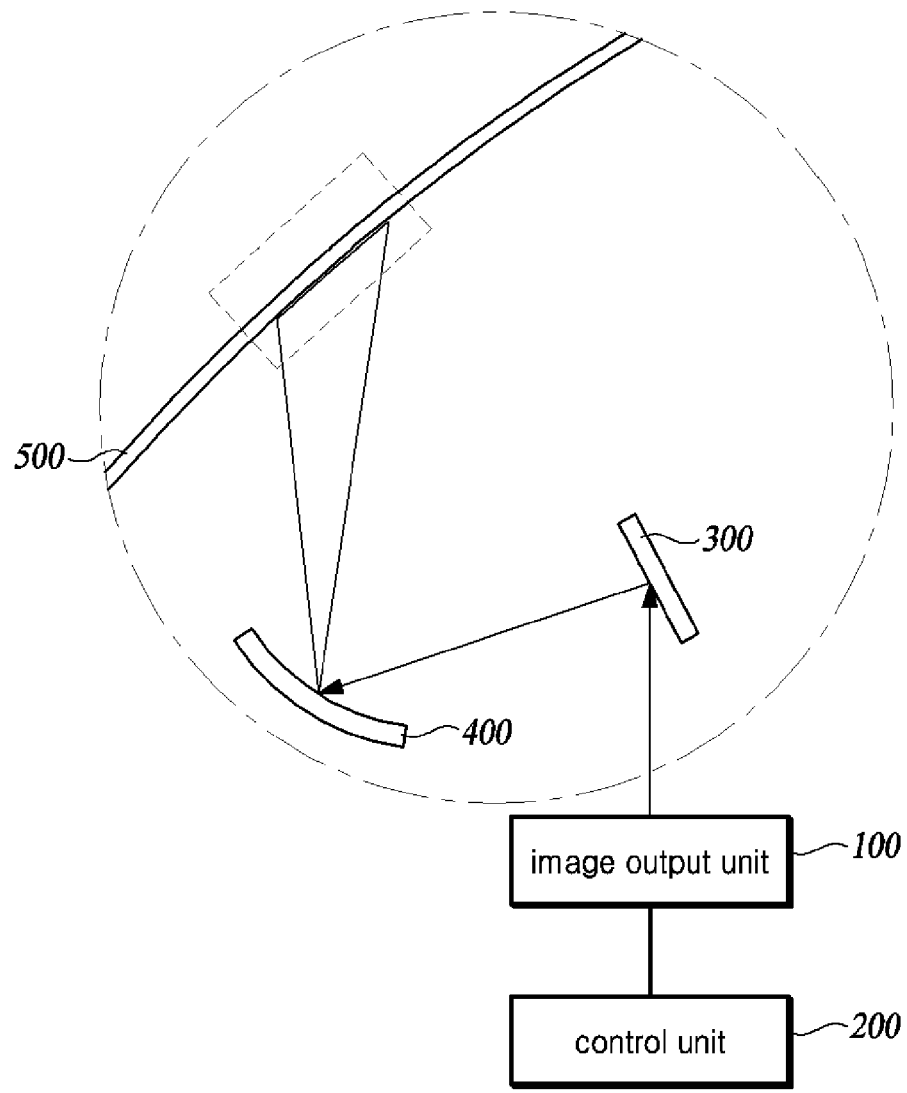
FIG. 2 is a block diagram showing a head-up display device according to an embodiment of the present disclosure.
Figure 3:
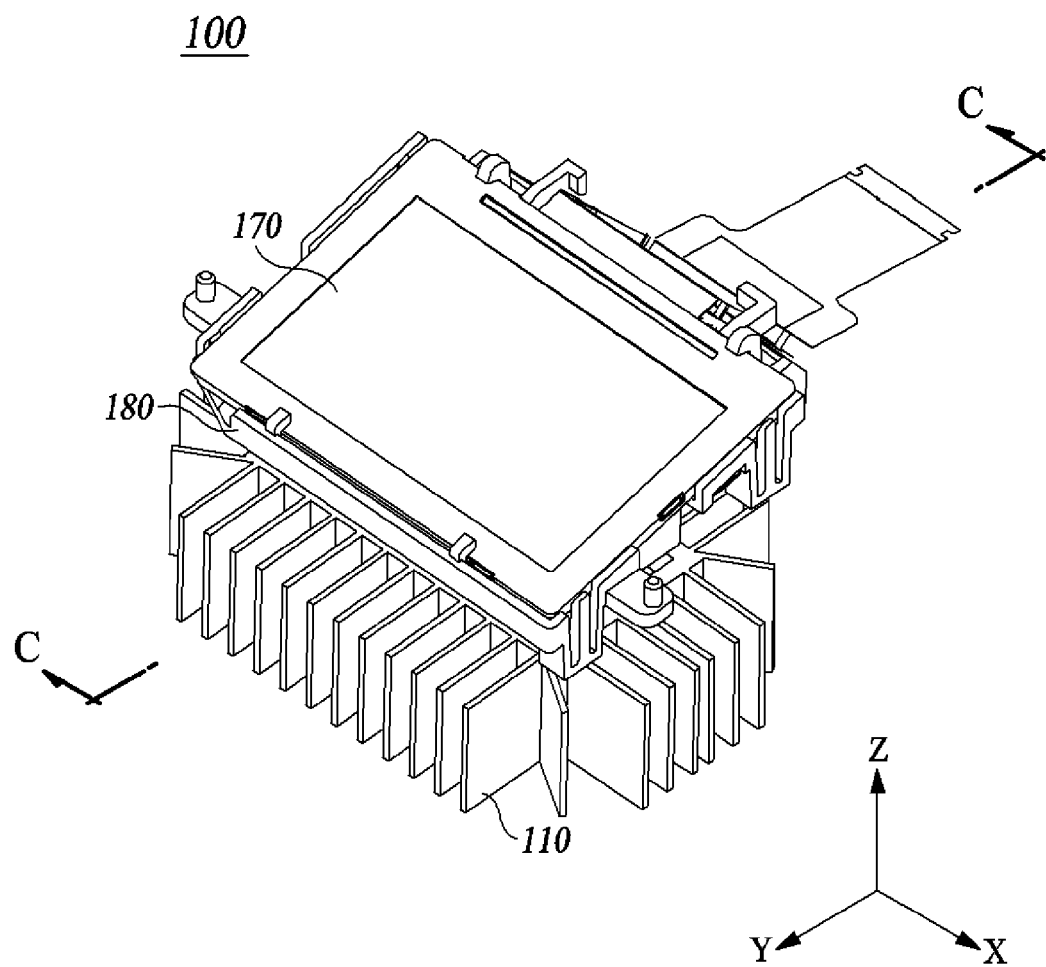
FIG. 3 is a perspective view showing an image output unit according to an embodiment of the present disclosure.
Figure 4:
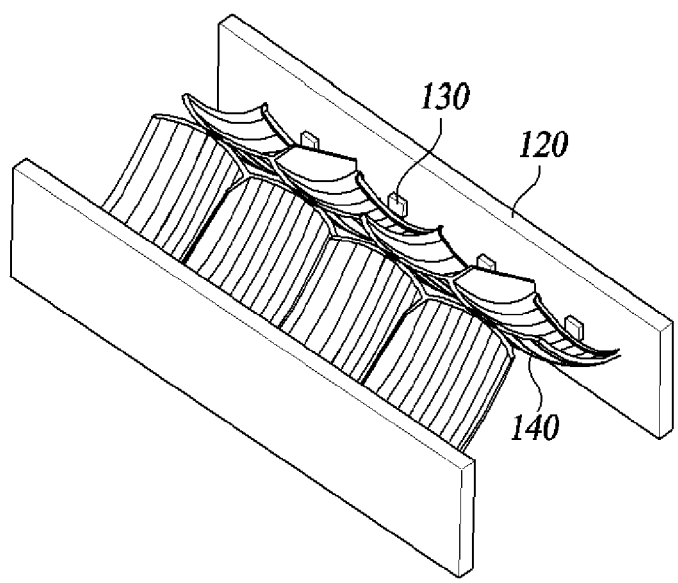
FIG. 4 is a sectional view of the image output unit taken along line C-C of FIG. 3.
Figure 5:
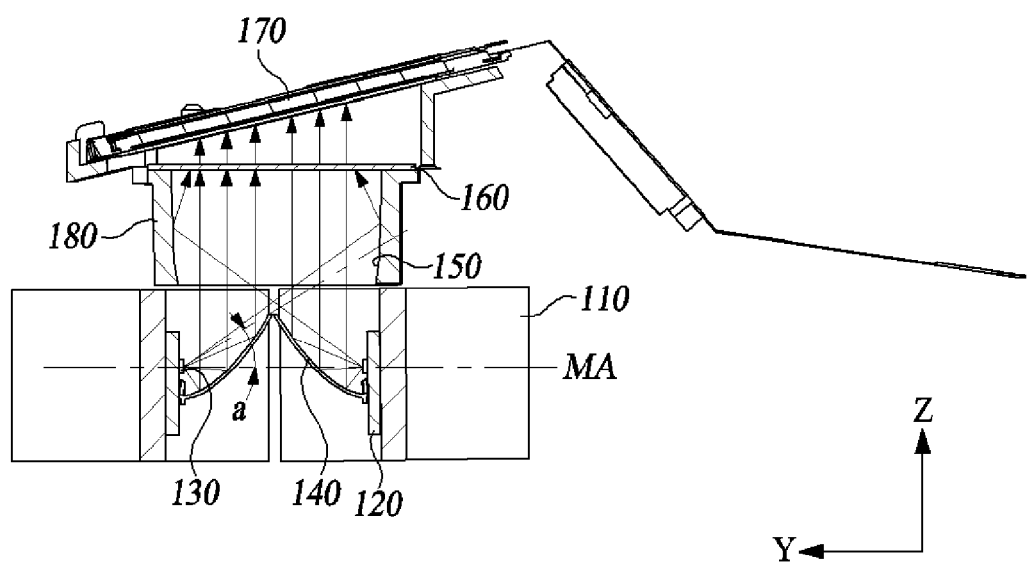
FIG. 5 is a perspective view showing a light source unit and a first reflector of FIG. 3.

FIG. 2 is a block diagram showing a head-up display device according to an embodiment of the present disclosure. FIG. 3 is a perspective view showing an image output unit according to an embodiment of the present disclosure. FIG. 4 is a sectional view of the image output unit according to an embodiment of the present disclosure. FIG. 5 is a perspective view showing a light source unit and a first reflector of FIG. 3.

Referring to FIG. 2, the head-up display device includes all or some of a fixed mirror 300, an aspherical mirror 400, and an image output unit 100.

The fixed mirror 300 is configured to reflect information, projected from the image output unit 100, towards the aspherical mirror 400, and the aspherical mirror 400 is configured to reflect light coming from the fixed mirror 300 and display the light on a windshield 500. The head-up display device may include a drive unit to be rotatable on the aspherical mirror 400, and may adjust the height of information displayed on the windshield 500 by the drive unit.

A control unit 200 is disposed to control an image which is output from the image output unit 100. Furthermore, the control unit 200 may control the position of the image pointing towards the windshield 500 by rotating an axis of the aspherical mirror 400.

Referring to FIGS. 3 and 4, the image output unit 100 includes all or some of a housing 180, a display unit 170, a diffuser 160, a heat sink 110, a printed circuit board 120, a light source unit 130, a first reflector 140, and a second reflector 150.

A receiving space is defined in the housing 180. The housing 180 may be made of a plastic or metal material, and may protect components disposed in the housing 180 from external shocks. The housing 180 may be mounted in a vehicle.

The display unit 170 is disposed over the housing. The display unit 170 generates information about an image that is to be projected on the windshield 500. The display unit 170 may indirectly receive light from the light source unit 130 to reduce the effect of radiant heat generated from the light source unit 130. The display unit 170 may be a Liquid Crystal Display (LCD).

The light source unit 130 is disposed such that a main optical axis MA is not directed at the display unit 170. The light source unit 130 is mounted on the printed circuit board 120. The light source unit 130 may include a plurality of light emitting devices, and the plurality of light emitting devices may be disposed in the housing to be opposite to each other. For instance, the printed circuit board 120 may be disposed on an inner wall of the housing 180, and thereby the light source unit 130 is mounted on the printed circuit board 120 so that the main optical axis MA is perpendicular to the longitudinal direction of the image output unit 100. Here, the longitudinal direction of the image output unit 100 means a Y-axis direction in FIG. 3.

When the plurality of light emitting devices are arranged to be opposite to each other as shown in FIG. 3, the main optical axes MA of the respective light emitting devices may be substantially parallel to each other. The main optical axis MA of the light source unit 130 may be disposed to be substantially parallel to the diffuser 160, but the present disclosure is not limited thereto.

The plurality of light emitting devices may be disposed to be opposite to and face each other. For instance, as shown in FIG. 4, two printed circuit boards 120 may be disposed on left and right sides to be opposite to each other, and the plurality of light emitting devices may be mounted on each printed circuit board 120 to be opposite to each other.

The first reflector 140 reflects at least some of light generated from the light source unit 130 towards the display unit 170. The first reflector 140 may be a Multi Facet Reflector (MFR) type or a Multifaceted Reflector type. The MFR type refers to a reflective surface on which a plurality of small facets are arranged to be in contact with each other. The light source unit 130 includes a plurality of light emitting devices, and may be disposed to reflect light generated by one light emitting device for each facet of the first reflector 140 towards the display unit 170.

The first reflector 140 may reflect light generated at an angle smaller than a first beam angle among light generated from the light source unit 130 towards the diffuser 160 as shown in FIG. 4. Here, the first beam angle a is an angle with respect to the main optical axis MA. The first beam angle a may range from about 45 degrees to about 55 degrees. The first reflector 140 may also reflect light directed downwards with respect to the main optical axis MA towards the diffuser 160. The light reflected by the first reflector 140 may be reflected in a direction substantially parallel to each other even if it is reflected in different regions of the first reflector 140.

The second reflector 150 is disposed between the diffuser 160 and the first reflector 140, and is provided to reflect at least some of light generated from the light source unit 130 towards the display unit 170. The second reflector 150 may be disposed on an inner wall of the housing 180.

The second reflector 150 may be disposed at a location spaced apart from the main optical axis MA of the light source unit 130 in a positive Z direction by a predetermined distance. The second reflector 150 may be a parabola type.

The second reflector 150 may be configured to reflect the remaining light, which is not directed at the first reflector among the light generated from the light source unit 130, towards the diffuser 160.

The heat sink 110 is disposed on a surface of the printed circuit board 120. The heat sink 110 may be disposed on an outer surface of the printed circuit board to radiate heat generated from the light source unit 130 and the printed circuit board 120 to an outside. The heat sink 110 may be disposed under the housing 180 to be adjacent thereto.

The diffuser 160 is disposed on an optical path of the light source unit 130 reflected from the first reflector 140 to uniformly make light. The diffuser 160 may uniformly make light reflected from the first reflector 140 as well as light reflected from the second reflector 150. The diffuser 160 is disposed under the display unit 170 to uniformly focus light generated from the light source unit 130 on the display unit 170.

Referring to FIG. 5, according to an embodiment, two printed circuit boards 120 are vertically arranged to be spaced apart from each other. A plurality of light emitting devices are disposed on each printed circuit board 120. The plurality of light emitting devices may be arranged in a longitudinal direction of the first reflector 140 to be spaced apart from each other by a preset distance.

Figure 6:
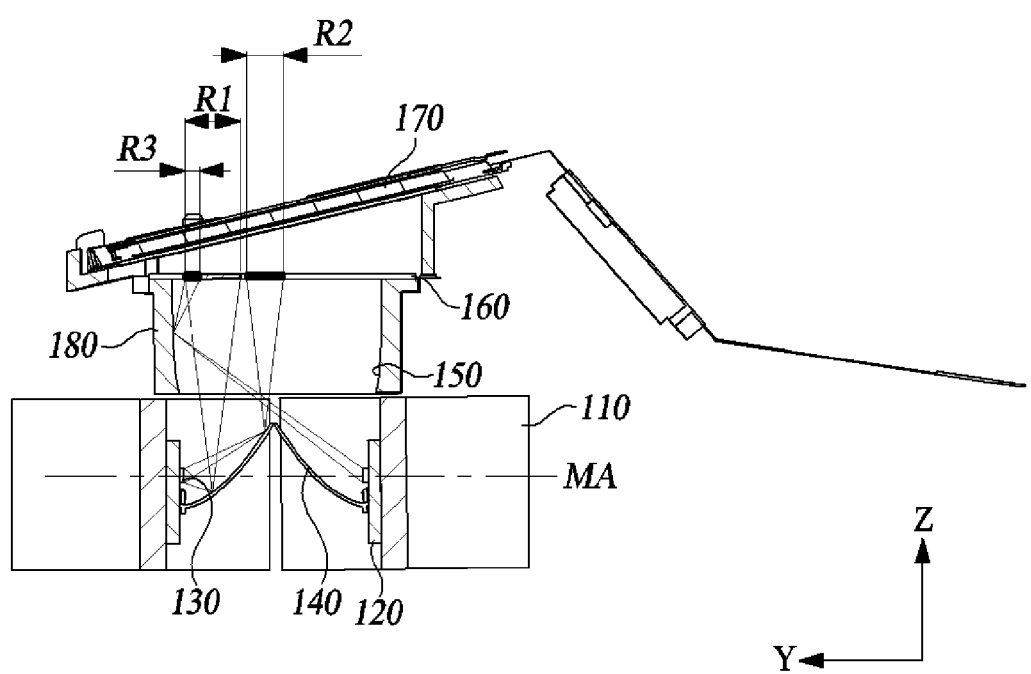
FIG. 6 is a diagram for explaining a process in which light is reflected from a light source unit to a diffuser.

FIG. 6 is a diagram for explaining a process in which light is reflected from a light source unit to a diffuser. Although FIG. 6 shows three optical paths where the first reflector 140 or the second reflector 150 reflects light emitted from the light source unit so that the light is pointed at the diffuser 160, this is merely illustrative. The light emitted from the light source unit 130 may be reflected from any part of the first reflector 140 and the second reflector 150 to be irradiated towards the diffuser 160.

The optical path of light reflected from the first reflector 140 among light emitted from the light source unit 130 will be described. Light reflected from a region which is adjacent to the light source unit 130 in the first reflector 140 is reflected to a R1 region on the diffuser 160 with a wide angle. In contrast, light reflected from a region which is distant from the light source unit 130 in the first reflector 140 is reflected to a R2 region on the diffuser 160 with a narrow angle.

Since the light reflected from the R1 region has a wide region, the light may be diffused. The light reflected from the R2 region has a narrow region and the light reflected from the first reflector 140 may be focused. When the light emitted from the light source unit 130 is reflected by the first reflector 140, the light is brightly condensed on the central portion of the diffuser 160. The further away from the central portion is, the lower the luminance is.

The light reflected from the second reflector 150 among the light emitted from the light source unit 130 is reflected to the R3 region on the diffuser. In other words, most of the light reflected by the second reflector 150 is condensed not on the central portion of the diffuser 160 but on the outer portion thereof.

When the light emitted from the light source unit 130 is reflected only by the first reflector 140, the light is condensed on the central portion of the diffuser 160, so that the overall luminance may not be uniform. Therefore, insufficient luminance of a portion which is away from the central portion is compensated for using the second reflector 150, thus leading to improved light uniformity.

If the light uniformity is improved using both the first reflector 140 and the second reflector 150, the number of applied diffusers can be minimized.

According to an embodiment, a head-up display device can prevent the deterioration of a display unit by absorbing a radiant-heat source generated from a light source unit with a reflective surface.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A head-up display device comprising:
a housing having a receiving space;
a display unit disposed over the housing;
a light source unit configured to emit light and having a main optical axis that is not directed to the display unit;
a first reflector configured to reflect a first portion of the light emitted from the light source unit towards the display unit;
a diffuser disposed on an optical path of the first portion of the light reflected from the first reflector; and
a second reflector disposed at the receiving space of the housing, positioned between the light source and the diffuser, and configured to reflect a second portion of the light emitted from the light source unit towards the display unit through the diffuser.

2. The head-up display device of claim 1, wherein the second reflector comprises a parabola type reflector.

3. The head-up display device of claim 1, wherein the first portion of the light reflected by the first reflector includes a portion of the light emitted from the light source at an angle smaller than a first beam angle.

4. The head-up display device of claim 3, wherein the second portion of the light reflected by the second reflector includes another portion of the light emitted from the light source at an angle greater than the first beam angle.

5. The head-up display device of claim 3, wherein the first beam angle ranges from about 45 degrees to about 55 degrees.

6. The head-up display device of claim 3, wherein:
the first portion of the light reflected by the first reflector includes a plurality of light beams respectively reflected at different portions of the first reflector, and
the plurality of light beams reflected by the first reflector is substantially parallel to each other.

7. The head-up display device of claim 1, wherein the main optical axis of the light source unit is substantially parallel to the diffuser.

8. A head-up display device comprising:
a housing having a receiving space;
a display unit disposed over the housing;
a light source unit configured to emit light and having a main optical axis that is not directed to the display unit;
a first reflector configured to reflect a first portion of the light emitted from the light source unit towards the display unit; and
a diffuser disposed on an optical path of the first portion of the light reflected from the first reflector,
wherein the first reflector comprises a Multi Facet Reflector (MFR) type reflector.

9. The head-up display device of claim 8, wherein the main optical axis of the light source unit is substantially parallel to the diffuser.

10. A head-up display device comprising:
a housing having a receiving space;
a display unit disposed over the housing;
a light source unit configured to emit light and having a main optical axis that is not directed to the display unit;
a first reflector configured to reflect a first portion of the light emitted from the light source unit towards the display unit; and
a diffuser disposed on an optical path of the first portion of the light reflected from the first reflector,
wherein the light source unit comprises a plurality of light emitting devices positioned to face each other.

11. The head-up display device of claim 10, wherein the plurality of light emitting devices is spaced apart from each other with a preset distance therebetween.

12. The head-up display device of claim 10, wherein the main optical axis of the light source unit is substantially parallel to the diffuser.

* * * * *